United States Patent

[11] 3,593,263

[72] Inventor Oluf Olsen
 Manchester, Mass.
[21] Appl. No. 881,999
[22] Filed Dec. 4, 1969
[45] Patented July 13, 1971
[73] Assignee BLH Electronics, Inc.
 Waltham, Mass.

[54] APPARATUS FOR VEHICLE DIRECTION SENSING
 9 Claims, 3 Drawing Figs.
[52] U.S. Cl. .................................................. 340/39,
 177/134
[51] Int. Cl. .................................................. G08g 1/02
[50] Field of Search .................................. 340/39;
 177/132, 133, 134, 136, 163, 210, 211

[56] References Cited
UNITED STATES PATENTS
3,533,481 10/1970 Paelian. .................... 177/134

Primary Examiner—Kathleen H. Claffy
Assistant Examiner—Randall P. Myers
Attorneys—James E. Mrose and Mary C. Thompson ABSTRACT: The direction of travel of a vehicle is determined by mounting four electrical strain gage elements at the four corners of a rectangular shaped platform and by interconnecting the same in a bridge circuit arrangement such that an output of a given polarity will be developed as the vehicle traverses a leading portion of the platform and an output of a different polarity will be developed as the vehicle traverses the trailing portion of the platform.

PATENTED JUL 13 1971 3,593,263

INVENTOR
OLUF OLSEN

Thomsen, Mrsen & Ginson
ATTORNEYS

APPARATUS FOR VEHICLE DIRECTION SENSING

BACKGROUND OF THE INVENTION

The present invention relates generally to vehicle direction sensing and in one particular aspect, to unique apparatus for sensing the direction of travel of a moving vehicle through the use of electrical strain gage responsive elements, the unique apparatus being particularly well suited for use with treadle type weighing scales.

Many application exist where it is desirable to be able to sense the direction of travel of a moving vehicle. For example, in toll booths, a treadle type weighing system may be used to digitally record the weight of each axle approaching the booth so that an accurate charge can be made. In such toll booth weighing systems it would be undesirable to have weight recorded on a vehicle which, for some reason, traversed the scales in the reverse direction in that an inaccurate toll charge would be made due to a double recording of a particular axle weight.

Another exemplary application for the use of vehicle direction sensing is in the counting of the number of vehicles passing down a particular street, crossing a bridge or the like. Such a count is important in enabling a proper determination to be made of the timing sequence for lights at an intersection, to determine whether a street needs to be widened to accommodate more vehicles, or to determine whether additional bridges or the like are needed. In determining such counts, it is important that the same vehicle be counted only once so that a proper vehicle count is obtained.

In the past, the sensing of direction of travel of a vehicle was obtained by the placing of four pairs of metal strips or pressure sensitive gages beneath a rubber pad or mat. The pairs of metal strips or pressure sensitive gages would be mounted such that upon the passing of a vehicle thereacross respective relays would be energized. By observing the sequence of relay energization, as a vehicle passed across the sensing devices, the direction of travel of the vehicle would be obtained. While somewhat satisfactory, one problem with the above-described direction sensing arrangements was that the rubber pads or mats were subject to rapid wear and would, in face, crack. The cracking would have the disadvantageous effect of allowing both dirt and water to get into the sensing devices and thereby destroy both their reliability and use. Moreover, the prior art type direction sensing arrangements lacked precision measurement and were difficult to install.

SUMMARY OF THE INVENTION

Accordingly, one object of the present invention is the provision of unique apparatus for vehicle direction sensing.

Another object of this invention is to provide a novel and improved apparatus which includes electrical strain gage elements for sensing the direction of travel of a vehicle.

Still another object of this invention is to provide a novel and improved apparatus for sensing the direction of travel of a vehicle which is particularly well suited for use in conjunction with a treadle scale type system such that the true weight of a vehicle may be realized regardless of its direction of travel.

One other object of the subject invention is to provide a unique vehicle direction sensing apparatus which includes a platform having electrical strain responsive elements mounted thereon and connected in a circuit arrangement such that the direction of travel of a vehicle may be determined by examining the polarity of the output of the circuit arrangement.

In one practice of these teachings a substantially rigid platform structure of relatively broad area and having a leading portion and a trailing portion includes a plurality of electrical strain responsive elements mounted in the separate corners thereof and connected in a bridge circuit arrangement such that different polarity output voltages will be generated depending upon which portion along the platform the vehicle is traversing.

BRIEF DESCRIPTION OF THE DRAWINGS

Although the features of this invention considered to be novel are expressed in the appended claims, further details as to preferred practices and as to the further objects and features thereof may be most readily comprehended through reference to the following description taken in connection with accompanying drawings, wherein:

DETAILED DESCRIPTION OF THE PREFERRED EMBODIMENT

Figure 1:
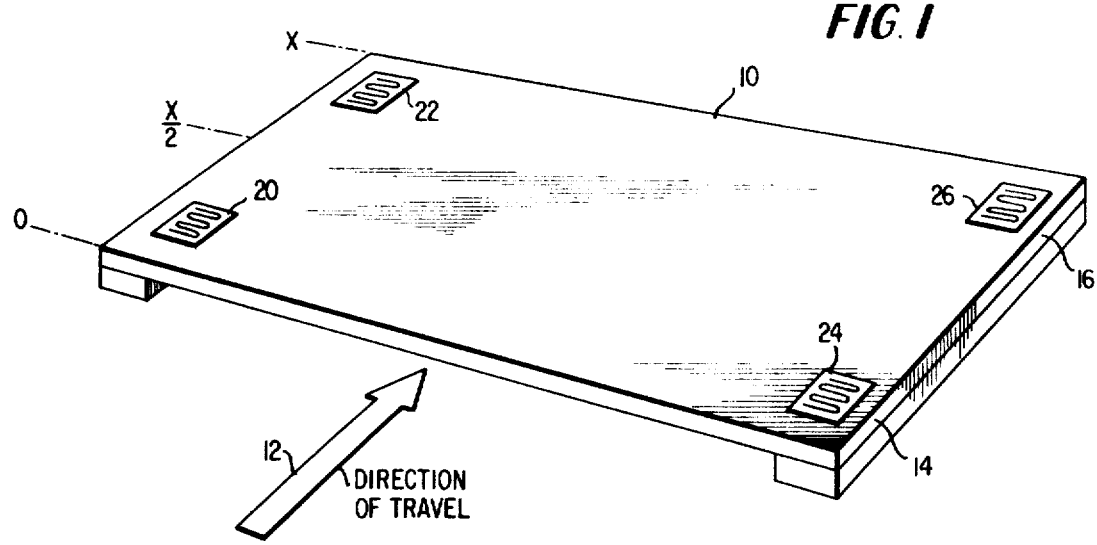
FIG. 1 portrays a preferred embodiment of the positioning of electrical strain gage responsive elements upon a platform used for vehicle direction sensing according to the present invention.

Referring now to the drawings wherein like reference numerals designate identical, or corresponding parts throughout the several views, and more particularly to FIG. 1 thereof wherein is portrayed a substantially rigid platform 10 of a relatively broad area and having electrical strain gages mounted thereupon in a unique fashion for sensing the direction of travel of a vehicle approaching in a direction indicated by the arrow 12. The platform 10 is generally of rectangular shape and is shown as having a leading portion 14 and a trailing portion 16. The electrical strain gages 20, 22, 24 and 26 may be of the wire, foil or semiconductor types and are mounted in the four separate corners of the platform structure 10. Additionally, the electrical strain gages 20, 22, 24 and 26 are positioned in such a direction as to be in tension or compression upon the deformation of the platform structure 10 due to the application of a load thereto depending upon gage placement. It can be seen that as a vehicle approaches the leading portion 14 of the platform 10, the electrical strain gages 20 and 24 will experience a greater force in tension than that of the strain gages 22 and 26 due to a greater deformation in the portion of the platform to which the vehicle is applied. Likewise, as the vehicle moves into the trailing portion 16 of the platform 10 the electrical strain gages 22 and 26 will experience a greater tension than that of strain gages 20 and 24. At some place at the center of the platform 10, a vehicle crossing that point will cause an equal force in tension to be applied to each of the four electrical strain gages 20, 22, 24 and 26.

Figure 2:
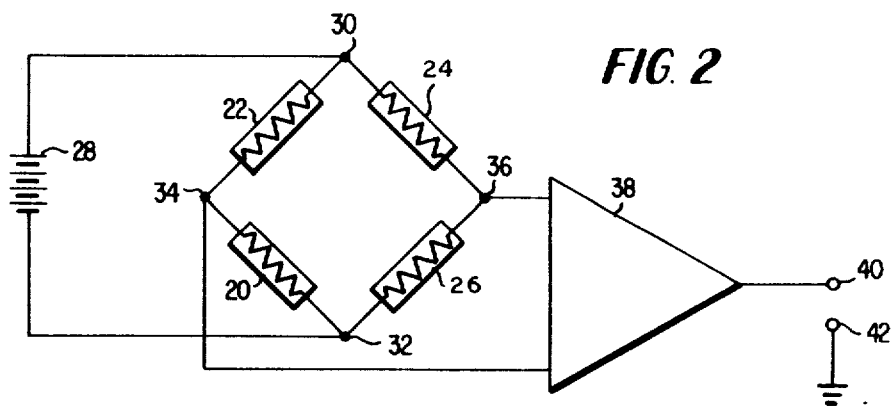
FIG. 2 illustrates a bridge circuit arrangement connecting the electrical strain gage responsive elements of the subject invention in such a fashion as to sense the direction of travel of a moving vehicle; and, FIG. 3 is a graph showing typical output voltage curves for a vehicle as it traverses the platform of the subject invention.
Figure 3:
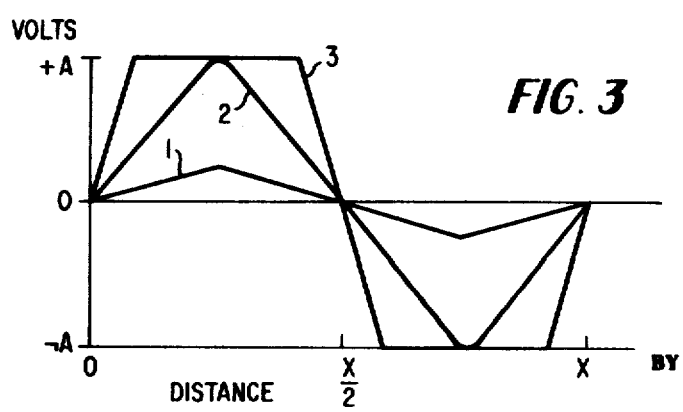

Referring now to FIG. 2, a bridge circuit arrangement is therein disclosed for interconnecting the strain gage elements of FIG. 1 in such a fashion as to sense the direction of travel of a moving vehicle. In particular, a DC source of excitation voltage 28 is applied to the terminal points 30 and 32 to thereby apply the same across serially connected electrical strain gages 20 and 22 and serially connected electrical strain gages 26 and 24. The output from the bridge circuit arrangement is taken across terminal points 34 and 36 and is applied to a conventional DC differential amplifier 38, the function of which is to amplify the voltage appearing across the terminals 34 and 36 and to give a differential reading thereof at output terminals 40 and 42. With the bridge circuit arrangement as shown, a vehicle load passing exactly at the center of the rectangular platform 10 of FIG. 1 will cause equal strain output from each of the four gages 20, 22, 24 and 26 with a net zero output voltage for a given bridge excitation. If the vehicle load were now placed at the leading portion 14 of the platform 10, the opposite arm gages 20 and 24 will sense more strain in tension than the gages 22 and 26 on the trailing portion of the platform 10 and an output of a given polarity will appear at terminals 40 and 42. Conversely, as the vehicle load is moved to the trailing portion 16 of the bridge, the opposite arm gages 22 and 26 will sense more in tension strain than the gages 20 and 24 and the output signal at terminals 40 and 42 will now reverse in polarity. This effect can be clearly seen in reference to FIG. 3 wherein typical output curves for three different weight vehicle loads 1, 2 and 3 shown. For example, the curves of FIG. 3 show that as a vehicle passes the leading edge portion 14 of the platform 10, namely, from 0 to ($x/2$) inches (where $x$ is the width of the platform and may be typically 15 inches), the output voltage appearing at terminals 40 and 42 will be positive and peak when the gages 20 and 24 are in greatest tension and will be zero as the vehicle passes the center of the platform and peak negatively when the gages 22 and 26 are in greatest tension. It should be understood that the output of the leading portion 14 could equally have been chosen to be negative, while that of the trailing portion 16 being chosen to be positive.

In addition, it should be noted that of the three different weight vehicle load indicating curves 1, 2 and 3, the number three curve represents the heaviest load and the number one curve is the lightest.

It should also be understood that conventional output logic circuitry could be connected to the output terminals 40 and 42 to sense the polarity of voltage appearing thereacross and thereby indicate the particular location of a vehicle traveling across the platform 10 at any given time. Such logic circuitry could include voltage comparators or other conventional threshold type devices. Additional conventional logic gating circuitry could be used to indicate the sequence of polarity changes, for example positive to negative, and thereby indicate whether the vehicle is traversing in a forward or reverse direction so as to avoid a double weight measurement or count which could produce error.

In one particularly well suited application for the subject invention, the platform 10 may be a treadle scale, such as the type disclosed in copending application Ser. No. 682,278, filed Nov. 13, 1967, now U.S. Pat. No. 3,474,857 issued on Oct. 28, 1969 and entitled "Strain-Gaged Treadle Scales," by Eric Laimins, which are typically used to measure axle weights in toll booths or the like. Thus, with the subject invention, if a vehicle being weighed should reverse direction during the weighing procedure, this will be immediately sensed so that a correction for the same may be automatically obtained.

It should now be apparent that the apparatus of the herein described invention allows for the reliable indication of the direction of travel of a vehicle that is both easy to install and is of long life.

Obviously, numerous modifications and variations of the present invention are possible in light of the above teachings. For example, the platform 10 of the subject invention may be either portable or fixedly secured to a road. Additionally, it should be understood that two or more similar type platforms may be placed in a side-by-side relation so that both of the axles of a vehicle may be simultaneously weighed and the direction thereof sensed. Furthermore, while the platform of the subject invention has been shown as being preferably of rectangular shape and having four electrical strain gages positioned at the four corners thereof, the invention is not so limited and would operate with two strain gage elements and with platforms of differing shapes. It is therefore to be understood that within the scope of the appended claims the invention may be practiced otherwise than as specifically described herein.

What is claimed as new and desired to be secured by Letters Patent of the United States is:

1. Apparatus for sensing the direction of travel of a vehicle comprising a substantially rigid platform structure of relatively broad area and having a leading portion and a trailing portion, at least a first electrical strain gage means mounted upon the leading portion of said platform structure and responsive to deformations induced upon said leading portion upon the application of a vehicle load thereto, at least a second electrical strain gage means mounted upon the trailing portion of said platform structure and responsive to deformations induced upon said trailing portion upon the application of a vehicle load thereto, and an electrical bridge circuit arrangement having an output therefrom and including said first electrical strain gage means and said second electrical strain gage means connected in a pair of arms thereof in such a fashion that means connected to the output of said bridge circuit arrangement will provide an output of a first polarity upon said vehicle load passing said leading portion of said platform and an output of a second polarity upon said vehicle load passing said trailing portion of said platform whereby the direction of travel of said vehicle may be readily determined.

2. Apparatus for sensing the direction of travel of a vehicle as in claim 1, wherein said bridge circuit arrangement is energized by a source of DC voltage which is connected across said first electrical strain gage means and said second electrical strain gage means which are serially connected in said pair of arms.

3. Apparatus for sensing the direction of travel of a vehicle as in claim 2, wherein is included a third electrical strain gage means mounted upon the leading portion of said platform structure and responsive to deformations induced upon said leading portion upon the application of a vehicle load thereto and a fourth electrical strain gage means mounted upon the trailing portion of said platform structure and responsive to deformations induced upon said trailing portion upon the application of a vehicle load thereto, said third electrical strain gage means and said fourth electrical strain gage means being connected in a pair of arms of said bridge circuit arrangement differing from that of the pair of arms of said first electrical strain gage means and said second electrical strain gage means.

4. Apparatus for sensing the direction of travel of a vehicle as in claim 3, wherein said first electrical strain gage means and said third electrical strain gage means are connected in opposite arms of said bridge circuit arrangement and wherein said second electrical strain gage means and said fourth electrical strain gage means are connected in a different pair of opposite arms of said bridge circuit arrangement.

5. Apparatus for sensing the direction of travel of a vehicle as in claim 4, wherein said means connected to the output of said bridge circuit arrangement is a DC differential amplifier, the output of said bridge circuit arrangement being taken across the terminal point joining said first electrical strain gage means and said second electrical strain gage means and the terminal point joining said third electrical strain gage means and said fourth electrical strain gage means.

6. Apparatus for sensing the direction of travel of a vehicle as in claim 5, wherein said first, second, third and fourth electrical strain gage elements are of the tension or compression responsive type.

7. Apparatus for sensing the direction of travel of a vehicle as in claim 6, wherein said platform is of substantially rectangular shape and wherein said first, second, third, and fourth electrical strain gage elements are each positioned near a different corner of said platform.

8. Apparatus for sensing the direction of travel of a vehicle as in claim 7, wherein the output of said DC differential amplifier will be zero when the vehicle load is at the center of said platform.

9. Apparatus for sensing the direction of travel of a vehicle as in claim 8, wherein said platform is a treadle scale used to measure the axle weight of a vehicle as it passes thereacross without error due to vehicle direction changes.